United States Patent
Schang et al.

(10) Patent No.: US 9,268,374 B2
(45) Date of Patent: Feb. 23, 2016

(54) PROTECTION FOR TOUCHPAD

(71) Applicant: Compagnie Industrielle et Financiere D'Ingenierie "Ingenico", Paris (FR)

(72) Inventors: Bernard Schang, Le Mesnil Saint Denis (FR); Alexandre Quenet, Paris (FR)

(73) Assignee: INGENICO GROUP, Paris (FR)

( * ) Notice: Subject to any disclaimer, the term of this patent is extended or adjusted under 35 U.S.C. 154(b) by 60 days.

(21) Appl. No.: 14/167,549

(22) Filed: Jan. 29, 2014

(65) Prior Publication Data

US 2014/0211107 A1 Jul. 31, 2014

(30) Foreign Application Priority Data

Jan. 29, 2013 (FR) ..................... 13 50750

(51) Int. Cl.
| | |
|---|---|
| G06F 1/16 | (2006.01) |
| G06F 21/83 | (2013.01) |
| G08B 13/12 | (2006.01) |
| G06F 21/86 | (2013.01) |
| G07F 19/00 | (2006.01) |
| G07F 7/10 | (2006.01) |

(52) U.S. Cl.
CPC ............. *G06F 1/1692* (2013.01); *G06F 21/83* (2013.01); *G06F 21/86* (2013.01); *G07F 7/1033* (2013.01); *G07F 19/201* (2013.01); *G08B 13/128* (2013.01); *G06F 2221/2101* (2013.01)

(58) Field of Classification Search
CPC .................................. G06F 21/88; G06F 21/83
See application file for complete search history.

(56) References Cited

U.S. PATENT DOCUMENTS

| | | | |
|---|---|---|---|
| 2006/0259788 A1 | 11/2006 | Elbert et al. | |
| 2008/0106366 A1* | 5/2008 | Zhang et al. | 340/5.1 |
| 2008/0278353 A1 | 11/2008 | Smith et al. | |
| 2008/0278355 A1 | 11/2008 | Moore et al. | |
| 2012/0180140 A1* | 7/2012 | Barrowman et al. | 726/34 |
| 2013/0155019 A1* | 6/2013 | Froment et al. | 345/174 |

OTHER PUBLICATIONS

French Search report dated Sep. 27, 2013 for corresponding French Patent Application No. 1350750, filed Jan. 29, 2013.

* cited by examiner

*Primary Examiner* — Gerald Johnson
(74) *Attorney, Agent, or Firm* — David D. Brush; Westman, Champlin & Koehler, P.A.

(57) ABSTRACT

A touchpad includes at least one supporting plate and at least one flexible printed circuit fixed to the supporting plate. The supporting plate includes at least one first electrical protection track, made by a conductive ink, connected to at least one connection track with a predetermined value of potential and at least one connection track for connection towards a processor.

8 Claims, 2 Drawing Sheets

PROTECTION FOR TOUCHPAD

1 FIELD OF THE INVENTION

The technique described pertains to the field of devices incorporating touchscreens. More specifically, the present invention pertains to the field of the terminals such as pay terminals comprising touchscreens.

2 PRIOR ART SOLUTIONS

Terminals comprising touchscreens are becoming increasingly numerous. These are for example smartphones, digital tablets, etc. In the banking field, terminals have evolved more slowly than in the other fields, chiefly for reasons of security. Indeed, a terminal (such as a pay terminal) dealing with purchase or sales transactions is necessarily expected to show a certain degree of security. Thus the terminal must ensure firstly its own security, then the securing of the payment means and finally the securing of the part of the bank transactions that concerns it.

This is why touchscreen pay terminals have appeared relatively later than the other terminals. However, despite this late appearance, there are persisting problems of security in the use of a touch screen. Indeed, although the use of a touchscreen offers advantages such as, for example, the possible elimination of the physical keypad, the possibility of modifying the display as a function of the transactions, the diversity of entry modes etc., the physical security of the terminal is still threatened.

Thus it has been noted that adjoining a touchscreen to a payment terminal could enable attackers to penetrate the terminal without activating a securitizing procedure such as for example the erasure of relevant data from the memories of the terminal.

Indeed, since a touchscreen is a particular component, the designers of existing terminals have hitherto never envisaged the possibility that it might be subjected to deliberate intrusion by an attacker. In certain cases they have omitted to secure the touchpad as such (i.e. for its own sake), in the security measures implemented.

Figure 1:
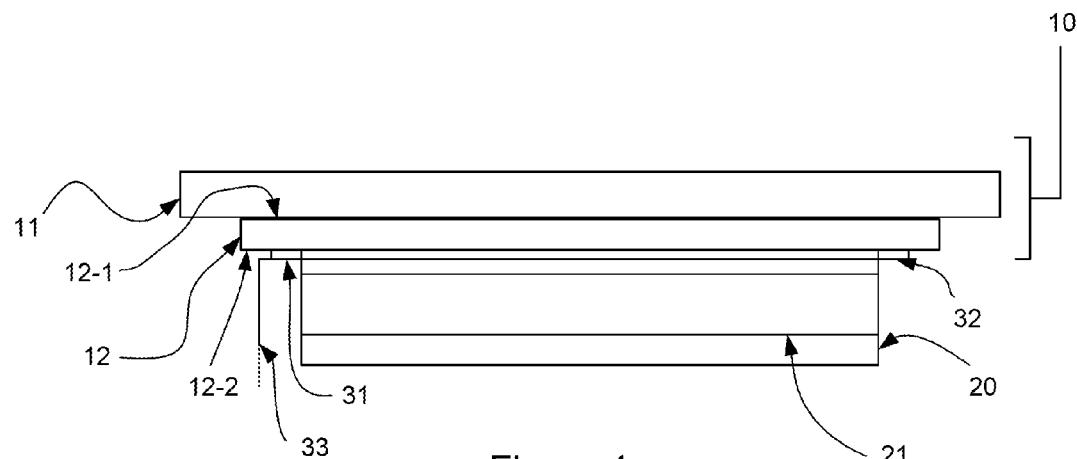

For a better understanding of the problem posed, the architecture of a classic touchpad is described with reference to FIG. 1. In the diagram of FIG. 1, the proportions of the different components are not necessarily preserved.

A touchpad 10 has a transparent upper plate 11 known as a "top glass" and a transparent lower plate 12 known as a "bottom glass". As a rule, the upper plate 11 is an inert glass plate serving mainly to protect the screen. Its thickness is of the order of one millimeter. As represented, the top glass plate 11 can be bigger than the transparent bottom glass plate 12. The bottom glass plate 12, which also has a thickness if the order of one millimeter, is the glass plate that comprises the transparent metal tracks needed for the touch function. More particularly, the front face 12-1 of the glass plate comprises detection tracks with x-axis coordinates while the back face 12-2 of the transparent bottom glass plate 12 comprises detection tracks with y-axis coordinates. In certain embodiments, the layouts of the x-axis and y-axis detection tracks are inverted. Sensors (not shown) are positioned on at least certain corners of the pad or on its rim, at the bottom glass plate 12, to be able to pick up differences in capacitance caused by the use of a finger or a stylus adapted to the pad. These sensors are generally integrated into a flexible printed circuit or FPC. The two plates are joined together to form the touchpad. The touchpad 10 itself is placed on a display unit 20 generally comprising a liquid-crystal screen 21.

Certain measures of protection have however been implemented but they pertain chiefly to detecting the removal of the touchpad. To prevent the removal of the touchpad, the designers of prior art terminals have therefore placed pellets made of conductive material 31, 32 . . . ) beneath it. These pellets are connected to an electric circuit 33. When the touchpad is lifted, the pellet which is in contact with the pad not longer sets up a link between at least two tracks of the electric circuit. This triggers the implementing of a securing procedure inside the terminal.

However, this technique suffers from some disadvantages. It has been shown that the use of conductive pellets is not sufficient for several reasons: on the one hand, glue can be inserted between the flexible printed circuit and the conductive pellets of the touchpad and the touchpad can therefore be lifted without implementing a securing process. On the other hand, the use of a conductive pellet does not make it possible to detect the breakage of the touchscreen. Such breakage would enable intrusion into the terminal without any need to raise the touchpad.

3 SUMMARY OF THE INVENTION

The invention does not present these problems of the prior art. Indeed, the invention pertains to a touchpad comprising at least one supporting plate and at least one flexible printed circuit fixed to said supporting plate.

According to the invention, said supporting plate comprises at least one first electrical protection track, made by means of a conductive ink, connected to at least one connection track with a predetermined value of potential P and connected to least one connection track for connection towards a processor.

Thus, unlike the prior art devices, the invention proposes a touchpad comprising an electric protection track enabling protection against breakage of the touchpad. Indeed, when the track is broken or damaged, the circuit is not connected to the potential P and the potential measured at the connection track with the processor becomes random. The processor to which the touchpad is connected is therefore capable of detecting this random value and of acting accordingly. The conductive ink can be an ITO type transparent ink.

According to one particular embodiment, said connection track for connection to the potential P comprises a junction element comprising at least two terminals separated by a space free of any connection.

According to one particular embodiment said connection track for connection to a processor comprises a junction element comprising at least two terminals separated by a space free of any connection.

According to one particular embodiment, said first protection track is printed on the forward face of said supporting plate.

According to one particular embodiment, said first protection track is printed on the rear face of said supporting plate.

According to one particular embodiment, said first protection track is printed on the face opposite the face comprising the first protection track.

Thus, the pad provides more efficient protection by enabling a more extensive identification of the breakage of the touchpad.

According to one particular embodiment, said plate is a glass plate comprising at least one electric detection track, said flexible printed circuit furthermore setting up at least one link between said at least one detection track and a processor to which said touchpad is intended to be connected.

According to one particular embodiment, said supporting plate has a predetermined shape and said protection track is printed along a continuous line appreciably close to at least one edge of said plate.

4 LIST OF FIGURES

Figure 2:
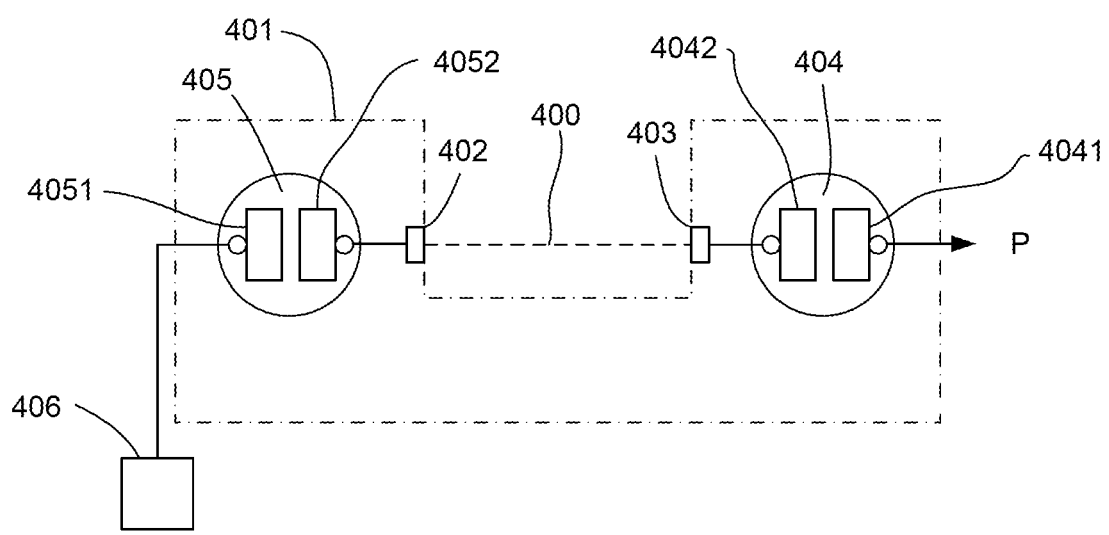

Other features and advantages of the invention shall appear more clearly from the following description of a preferred embodiment, given by way of a simple illustratory and non-exhaustive example and from the appended drawings, of which:

FIG. 1, already commented upon, presents a schematic view of a touch touchpad with a protection system of the prior art;

FIG. 2 illustrates the principle of one embodiment of the invention

Figure 3:
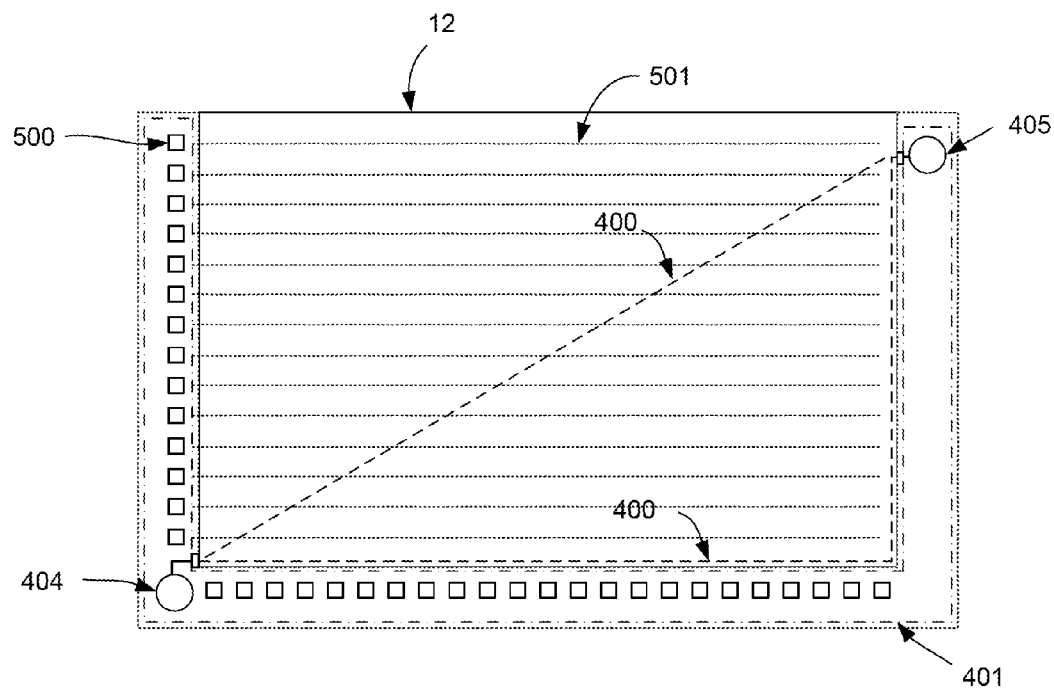

FIG. 3 describes an implementation of the principle presented here above.

5 DETAILED DESCRIPTION OF THE INVENTION

5.1 Reminder of the Principle of the Invention

As explained here above, it has been observed that it is possible to enter a terminal comprising a touchpad by dismantling or breaking it. The inventors have therefore sought to resolve this problem while at the same time preserving the properties inherent to this type of terminal.

In a first solution, an overlayer is added on to the touchpad. This overlayer is integrated into the casing of the terminal. However, because of the need to preserve the capacitive properties of the touchscreens and the luminosity of the screen, the thickness of such an overlayer will be necessarily limited and it can happen that this overlayer does not prevent the breakage of the touchpad.

In a second solution, the rim of the touchpad is reinforced and protected, for example by the addition of a circular protrusion to the rim of the touchpad. This solution consists in designing a terminal casing mold that comprises a protrusion that gets positioned on top of the rim of the upper face of the touchpad. Such a solution is worthwhile in that it prevents the dismantling of the touchpad. This solution however, on the one hand, does not preserve the esthetic qualities of the device and, on the other hand, does not ensure that it will be possible to detect the breakage of the touchpad.

Other techniques can also be envisaged. For example, a combination of the above-mentioned techniques is possible, provided that little importance is attached to the esthetic appearance of the terminal. Such a combination would make it possible to partially resolve one or more of the above-mentioned techniques without however providing a single solution to all the problems.

According to the invention, in at least one embodiment, the inventors have had the idea of introducing an electric detection circuit on the touchpad itself. More specifically, a touchpad is formed by at least two superimposed plates (11, 12 with reference to FIG. 1). These plates can be made of glass or polycarbonate. When a capacitive technology is applied, metal tracks made of indium tin oxide (ITO) that accumulate charges are placed on each side of the lower plate 12. A second plate (the upper plate 11) protects this lower plate 12. This second plate can be made of glass or another appropriate material. At least one sensor in each corner of the lower plate makes it possible to identify the positions where a contact is made. The number of sensors and their distribution however differs according to the embodiment. The unit constituted by these two plates and their sensors is called a touchpad. The touchpad is then positioned on top of the screen, which is generally a liquid-crystal screen.

To overcome the problems of breakage or unauthorized dismantling of the touchpad, the inventors therefore had the idea of directly inscribing an electric circuit on the rear face (or on the front face) of the lower plate of the touchpad. This electric circuit is connected to the security processor as shall be described in detail here below. In the event of breakage or dismantling of the touchpad, the electric circuit of the rear face of the lower plate no longer enables the predetermined value to be set at the potential P. The value of the electric potential P then becomes variable (floating). A security procedure is then applied. The terminal can then be deactivated and/or the sensitive information that it contains can be erased.

Associated with a technique of conductive pellets, the invention thus makes it possible, by means of one and only one circuit, to detect not only the dismantling but also the breakage of the touchpad in the pellet area. An attack in which the glass might be cut to access the conductive pellets becomes extremely difficult. It is also planned to implement a complete, transparent wiremesh made in this way on any support capable of receiving the ITO ink.

Naturally, the invention is not limited to this particular application. More particularly, the invention can be implemented in any situation where it can be necessary to protect a transparent plate on a terminal. The invention can especially be applied to any type of existing terminal, whether or not it is equipped with a touchpad.

5.2 Description of One Embodiment

A description is provided, with reference to this embodiment, of a particular implementation of the above technique in which the touchpad receives a printed circuit based on transparent, conductive ink. More particularly, on the rear face of the lower plate of the touchpad, an electric circuit based on transparent conductive ink is drawn. This electric circuit is called wiremesh. Even more particularly, the wiremesh track connected to the security processor is made out of a conductive, transparent material called ITO (<<indium tin oxide>>) deposited on the rear face of the lower glass plate of the touchpad. Thus, if it is attempted to break the glass of the touchpad, the ITO protection track is also broken and the security processor detects the intrusion. This ITO protection is inaccessible from the exterior because it is on the inner side of the glass.

FIG. 2 is a schematic drawing showing the principle of this embodiment.

A protection track 400 made of ITO is plotted on the rear face of the lower plate. The ITO protection track 400 is connected to the flexible printed circuit (FPC) 401 at at least two junction points (402, 403). The continuous electric circuit is extended from these two junction points 402, 403 towards two mechanical junction elements (404, 405) commonly called pucks by those skilled in the art. These two mechanical junction elements 404, 405 make it possible, through the use of conductive supports (not shown, made for example of elastomer, or a carbon pellets, to provide for a continuity of the electric circuit. These two pucks 404, 405 offer the possibility of detecting the dismantling of the touchpad while the ITO protection pad 400 offers the possibility of detecting the breakage of the touchpad. An ending 4041 of the first junction element 404 is connected to a potential P. An ending 4042 of the first junction element 404 is connected to the ITO track. An ending 4051 of the second junction element 405 is connected to an input 406 of the security processor. An ending 4052 of the first junction element 405 is connected to the ITO track.

Thus, as can be understood from the above explanations, this embodiment proposes both protection (through the pucks) against dismantling and (through the ITO protection track) against breakage. If the glass is broken (at the ITO protection track) or raised, the potential of the track is no longer the predetermined value of the potential (P). It becomes floating and this is detected by the security processor which can take the necessary measures.

In one specific embodiment of the invention, the securing ITO protection track that is inscribed on the glass is drawn at the most sensitive places of the touchpad, i.e. at the places where a break can cause a breach of security, in taking account of the fact also that other tracks are already disposed on the touchpad (to have the x and y coordinates of the entry, see further above).

Thus, the ITO protection track protects the pucks (or pads) from attacks from the top of the glass in the event of its breakage.

Referring to FIG. 3, we present an application of this embodiment. FIG. 3 is the rear view 12-2 of the plate 12. In FIG. 3, the bottom glass plate 12 has a set of metal tracks necessary for the touch function. Sensors (represented by squares, only one of which is numbered 500) are positioned on the rim of the touchpad, at the lower plate 12, to be able to pick up the differences in capacitance caused by the use of a finger or stylus adapted to the touchpad. Each of these sensors is associated with an ITO detection track (only one is numbered 501 to avoid burdening the diagram). An ITO protection track 400 is plotted on the lower plate (two examples of embodiments of the track 400 are shown in FIG. 3 to avoid greatly increasing the number of figures). This ITO protection track 400 is connected to the flexible printed circuit (FPC) 401 on at least two junction points (402, 403). The continuous electric circuit is extended from these two junction points towards the two mechanical junction elements (404, 405).

5.3 Complementary Embodiment

In a complementary embodiment of the invention (not shown), two ITO protection tracks are inscribed on the bottom glass. More particularly, in this complementary embodiment, a first ITO protection track is inscribed on the rear face of the plate (as in the above embodiment) and a second ITO track is inscribed on the forward face. This second ITO protection track, which can have a trace different from that of the first ITO protection track, is thus imprisoned between the lower plate and the upper plate.

The main contribution of this embodiment, as compared with known dismantling protection techniques such as conductive pellet detectors, is that the second ITO protection track, which is sandwiched between the cover glass and the bottom glass is inaccessible even through the top of the touchpad.

In a second complementary embodiment of the invention (not shown), a single ITO protection track is inscribed on the rear face. There is therefore no ITO track on the rear face of the lower plate.

The invention claimed is:

1. A touchpad comprising:
    at least one transparent supporting plate comprising at least one first electrical protection track made by a conductive ink, connected to at least one connection track with a predetermined value of potential and connected to at least one connection track for connection towards a processor; and
    at least one flexible printed circuit fixed to said transparent supporting plate.

2. The touchpad according to claim 1, wherein said connection track for connection to the potential comprises a junction element comprising at least two endings separated by a space free of any connection.

3. The touchpad according to claim 1, wherein said connection track for connection to a processor comprises a junction element comprising at least two endings separated by a space free of any connection.

4. The touchpad according to claim 1, wherein said first protection track is printed on a forward face of said transparent supporting plate.

5. The touchpad according to claim 1, wherein said first protection track is printed on a rear face of said transparent supporting plate.

6. The touchpad according to claim 1, wherein a second electric protection track is printed on a face of said transparent supporting plate that opposite a face of the transparent supporting plate comprising the first protection track.

7. The touchpad according to claim 1, wherein said transparent supporting plate is a plate made of glass or polycarbonate comprising at least one transparent detection track with coordinates, said flexible printed circuit furthermore comprising at least one link between said at least one transparent detection track with coordinates and a processor to which said touchpad is intended to be connected.

8. The touchpad according to claim 1, wherein said transparent supporting plate has a predetermined shape and said protection track is printed along a continuous line appreciably close to at least one edge of said plate.

* * * * *